(12) United States Patent
    Dobashi (10) Patent No.: US 7,249,840 B1
(45) Date of Patent: Jul. 31, 2007

(54) ACCESSORY

(75) Inventor: Hidetaka Dobashi, Kouhu (JP)

(73) Assignee: Crossfor Co., Ltd., Kouhu (JP)

( * ) Notice: Subject to any disclaimer, the term of this patent is extended or adjusted under 35 U.S.C. 154(b) by 0 days.

(21) Appl. No.: 11/510,975

(22) Filed: Aug. 28, 2006

(30) Foreign Application Priority Data

Jan. 24, 2006 (JP) .............................. 2006-015705

(51) Int. Cl.
    *G02C 11/02* (2006.01)
(52) U.S. Cl. ..................... 351/52; 351/51; 351/158
(58) Field of Classification Search ............... 351/51, 351/52, 41, 158, 110
    See application file for complete search history.

(56) References Cited

U.S. PATENT DOCUMENTS 4,245,896 A * 1/1981 Kaplan ..................... 351/41
4,988,181 A * 1/1991 Riach, Jr. ................. 351/52
6,024,445 A * 2/2000 Conner et al. ........... 351/110

FOREIGN PATENT DOCUMENTS

| DE | 86 15 067 | 9/1986 |
|----|-----------|--------|
| DE | 196 29 327 | 1/1998 |
| DE | 201 06 621 | 6/2001 |
| FR | 2 503 392 | 8/1982 |
| GB | 682.352 | 11/1952 |
| JP | 7-6809 | 2/1995 |
| JP | 3069720 | 4/2000 |

* cited by examiner

*Primary Examiner*—Hung Xuan Dang
(74) *Attorney, Agent, or Firm*—Greer, Burns & Crain, Ltd.

(57) ABSTRACT

An accessory comprises an insertion part, which is inserted into a through hole provided in the direction of thickness of a lens of eyeglasses and configured by combining an insertion core part with a sheathing member made of an elastic material, and a basic accessory part arranged jointly at an end of the insertion core part on the side of a surface of the lens. The insertion part is fixed to the lens by being pressed against the through hole with repulsive force caused by the compression of the sheathing member.

4 Claims, 6 Drawing Sheets

ACCESSORY

BACKGROUND OF THE INVENTION

1. Field of the Invention

The present invention relates to an accessory attached to a lens of eyeglasses.

2. Description of the Related Art

Conventionally, human beings use, what is called, accessories such as a ring, necklace, earrings, pierced earrings, etc. in order to decorate their bodies. Such accessories have a structure suitable for being directly put on a body, namely, directly put on a particular portion of a body, such as putting a ring on a finger, putting a necklace around neck, and putting earrings or pierced earrings in ears. Therefore, the accessories are not normally used to decorate a wearing person by being indirectly put on a body, like a brooch put on clothes, due to constraints such as an appearance derived from the structure, or the like.

To overcome such constraints of accessories, eyeglasses where an attachment hole for a pierced earring is provided in a lens to enable the pierced earring to be attached is proposed as disclosed by Patent Document 1. According to this invention, it is supposed to make variations and fashion of eyeglasses enjoyable with such a configuration.

[Patent Document 1] Japanese Registered Utility Model No. 3069720

This invention has the above described advantage, but also has the following problems: (1) the core of a pierced earring can possibly damage a lens or the rim of an attachment hole or its periphery when erroneously touching the lens, the rim or the periphery at the time of being inserted into the attachment hole of the lens, because the core of the pierced earring is made of metal; (2) it is burdensome to require an exacting work for inserting the core of the pierced earring into the small hole provided in the lens, and for fitting a catch as a stopper into the core, and the pierced earring and the catch tend to be lost when being detached from eyeglasses since they are separate parts; (3) a feeling of discomfort is produced by a sound of contact between the pierced earring and the lens, which is caused by the movement of the core inserted into the hole due to vibrations in the use of the eyeglasses; and (4) a portion protruding on the side of a back of the lens can possibly touch and injure a face or hand skin when the eyeglasses are worn, since the core of the pierced earring is longer than the thickness of the lens.

SUMMARY OF THE INVENTION

The present invention was developed in consideration of the above described problems. An accessory according to the present invention is an article of a new concept, which does not belong to the concept of conventional pierced earrings or an accessory directly put on a body, in a point of having a nature which cannot be put in ears, and cannot serve as pierced earrings, although the present invention has commonality in a point of being attached to eyeglasses likewise the pierced earrings disclosed by Patent Document 1.

Based on such a premise, it is an object of the present invention to provide a new accessory which can decorate the appearance of a wearing person by enhancing the beauty and the fashionability of eyeglasses themselves, and does not damage a lens, does not cause a discomfort sound due to vibrations, etc. in the use of the eyeglasses, is easy to be attached to the lens, and is difficult to be lost.

A second object of the present invention is to provide a safe accessory which does not injure a face or hand skin when eyeglasses are worn, in addition to the first object.

A third object of the present invention is to provide an accessory which aggressively enhances the safety of a face or hand skin when eyeglasses are worn, in addition to the first or the second object.

To achieve the above described objects, the present invention is characterized in the following configuration. Namely, an accessory of an invention according to a first embodiment (accessory in a first aspect of the present invention) comprises: an insertion part, which is inserted into a through hole provided in the direction of thickness of a lens of eyeglasses and configured by combining an insertion core part and a sheathing member made of an elastic material; and a basic accessory part, which is arranged jointly at an end of the insertion core part on the side of a surface of the lens, wherein the insertion part is pressed against the through hole with repulsive force caused by the compression of the sheathing member, and fixed to the lens.

An accessory of an invention according to a second embodiment is characterized in that the length of the insertion part is set to be identical to the thickness of the lens in the accessory of the first embodiment.

An accessory of an invention according to a third embodiment is characterized in that a pad part which covers an end of the insertion core part is provided at the end on the side of a back of the lens in the accessory of the first or second embodiments.

The accessory according to the invention of the first embodiment produces the effects of being able to decorate a wearing person by enhancing the beauty and the fashionability of eyeglasses with a basic accessory part, of preventing a lens from being damaged, preventing a discomfort sound from being produced in the use of eyeglasses, of being easy to handle, such as attaching to a lens, and of being difficult to be lost.

The accessory according to the invention in the second embodiment also produces the effect of being safe without injuring a face or hand skin when the eyeglasses are worn in addition to the effects of the invention recited in the first embodiment.

The accessory according to the third embodiment also produces the effect of being safe by aggressively preventing a face or hand skin from being injured when the eyeglasses are worn in addition to the effects of the invention of the first or second embodiments.

BRIEF DESCRIPTION OF THE DRAWINGS

The present invention will be more apparent from the following detailed description in conjunction with the accompanying drawings, in which.

DESCRIPTION OF THE PREFERRED EMBODIMENTS

A preferred embodiment according to the present invention is hereinafter described in detail with reference to the drawings.

Figure 1:
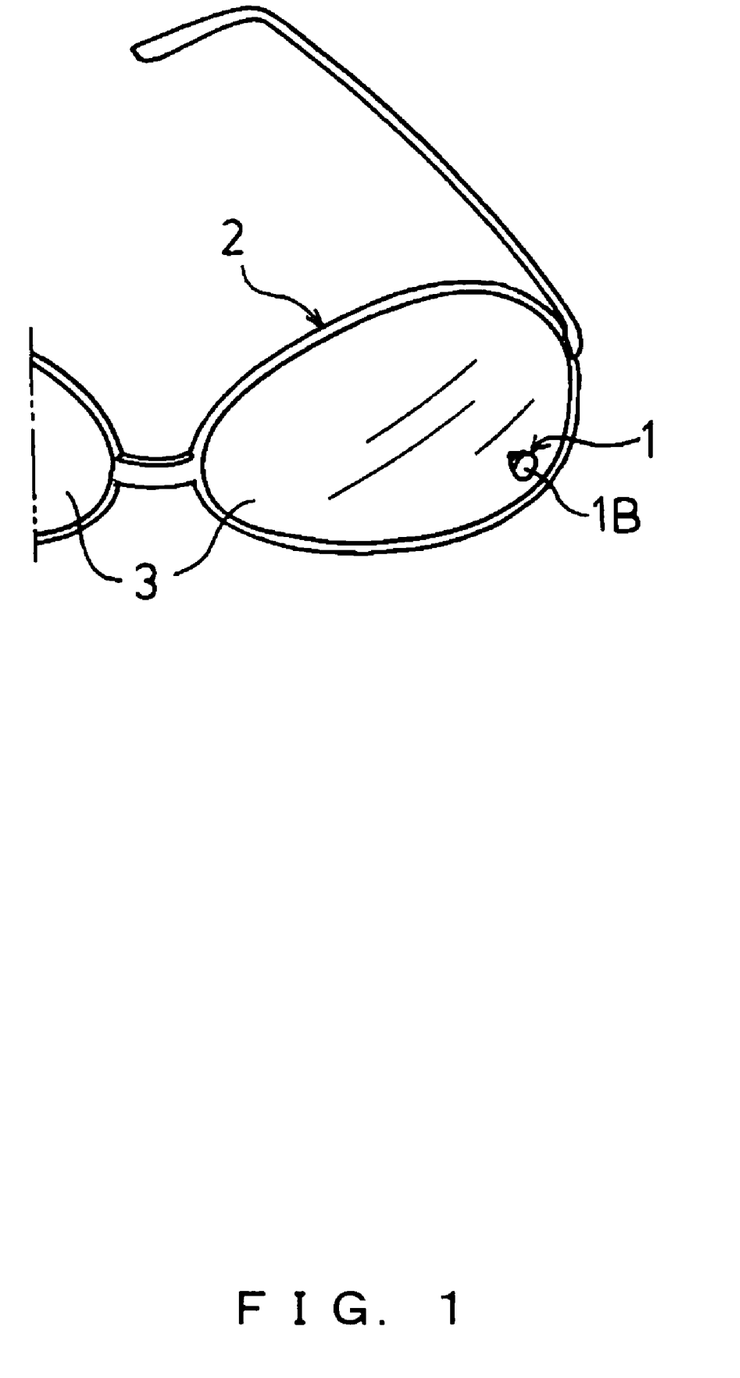
FIG. 1 is a conceptual perspective view showing a state where an accessory according to the present invention is attached to eyeglasses.
Figure 2:
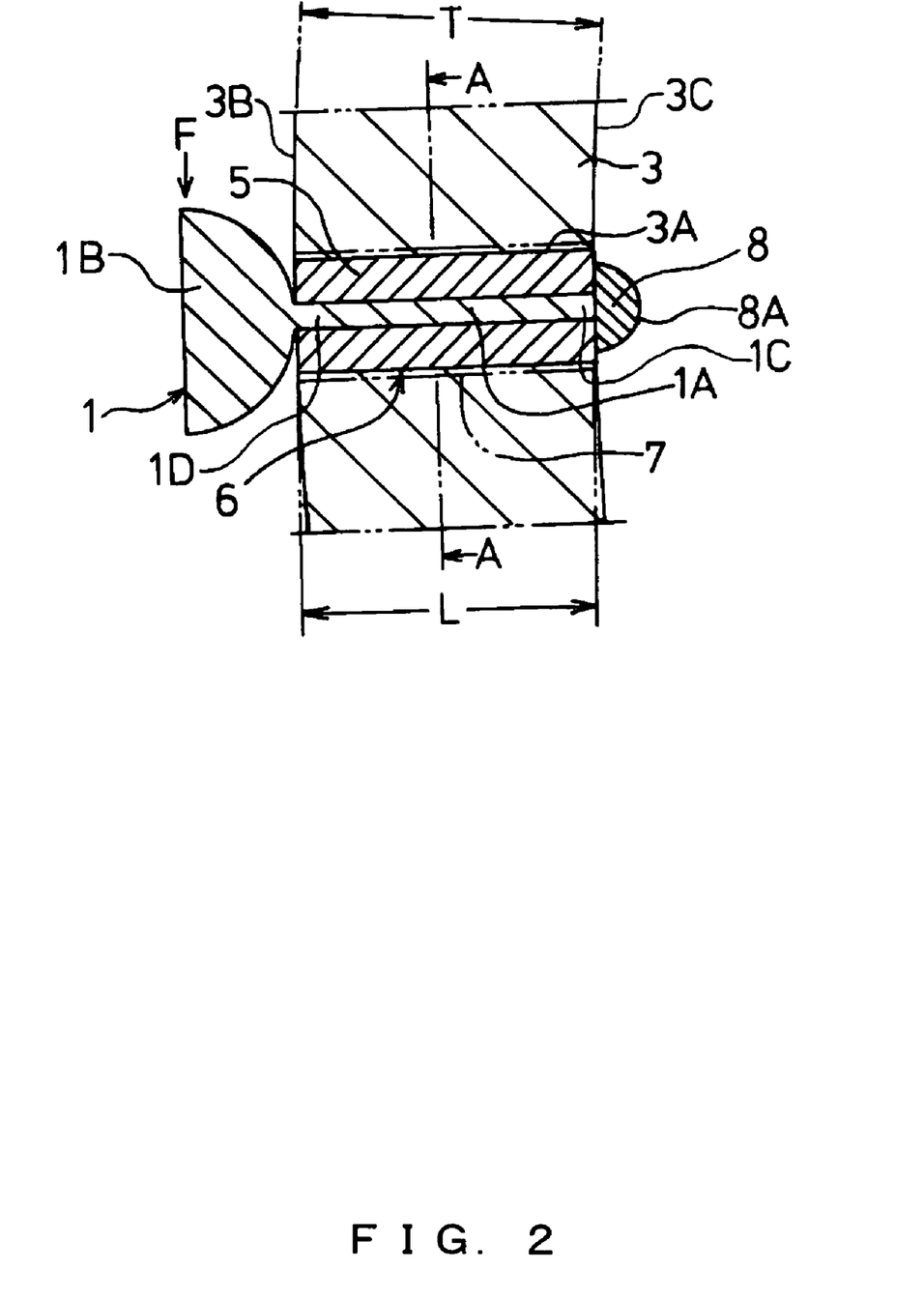
FIG. 2 is a conceptual side cross-sectional view showing the state enlarged.
Figure 3:
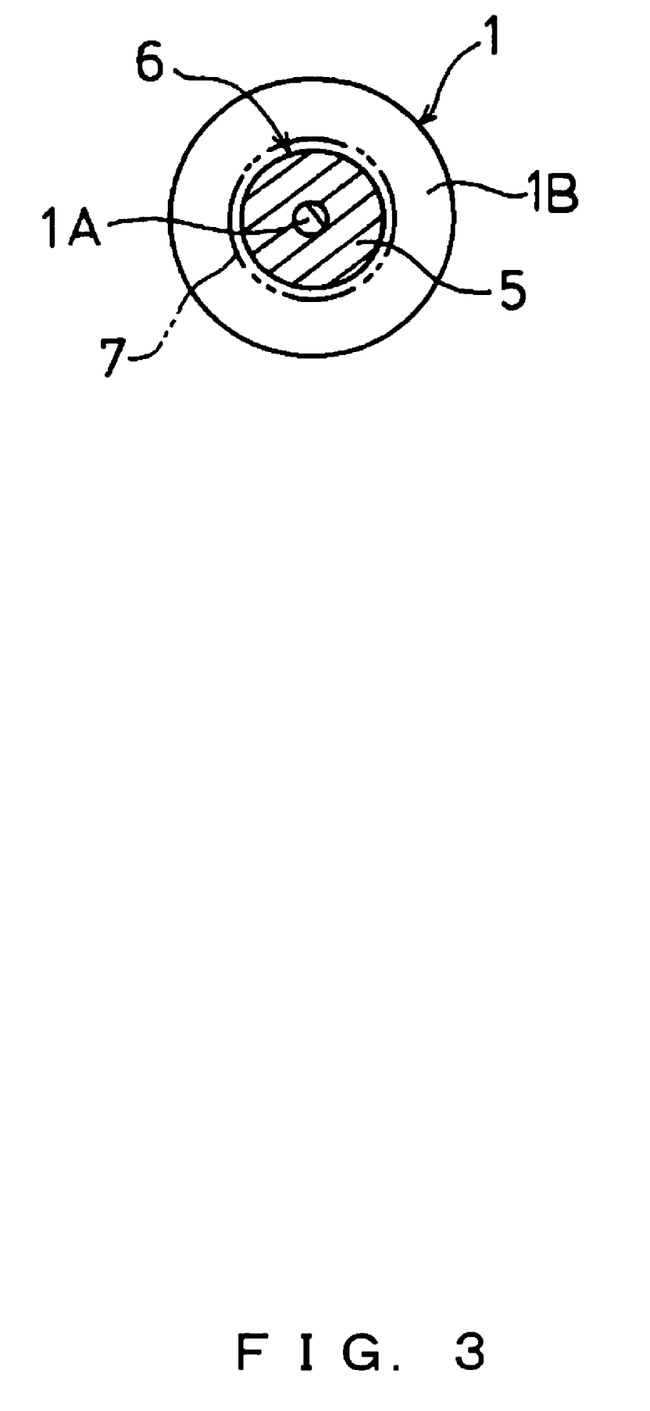
FIG. 3 is a cross-sectional view taken along a line A—A in FIG. 2.
Figure 4:
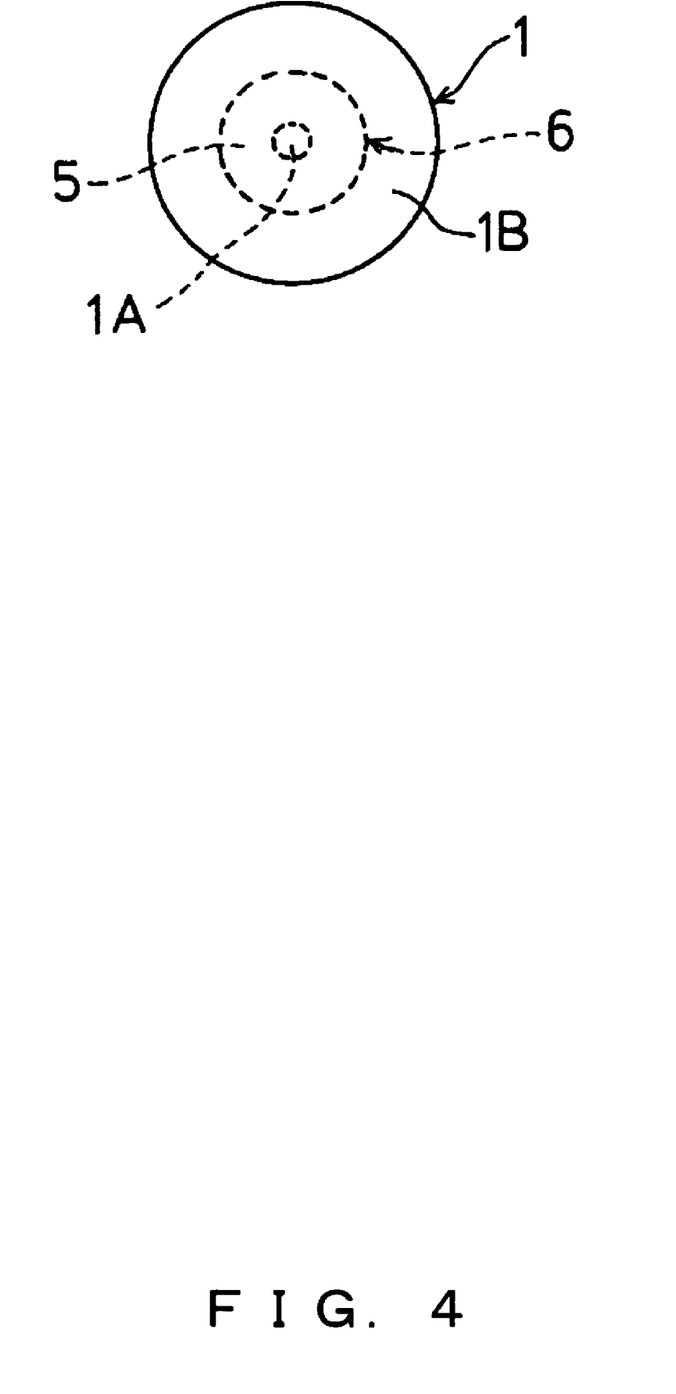
FIG. 4 is a conceptual enlarged front view of the accessory.
Figure 5:
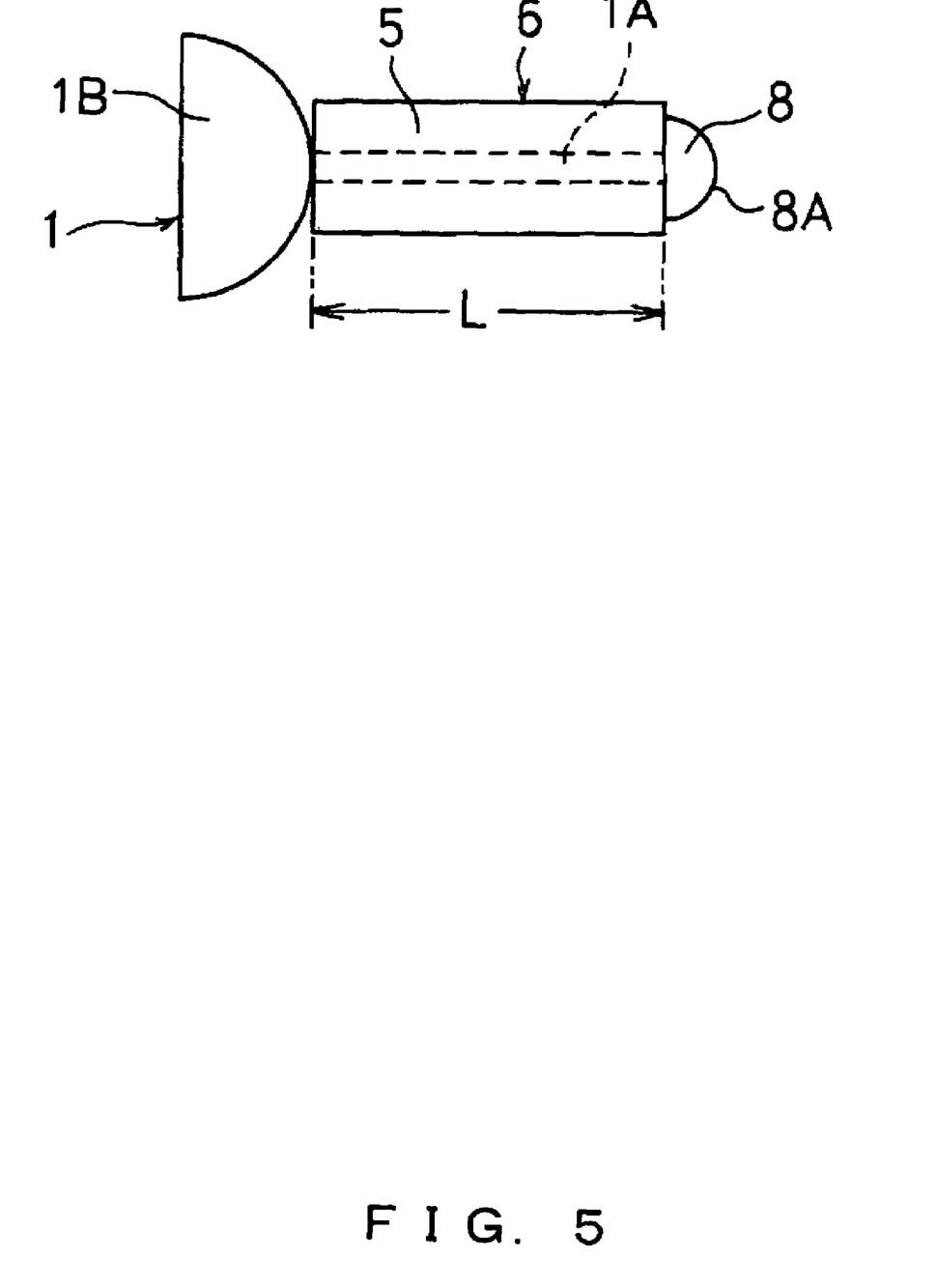
FIG. 5 is a conceptual enlarged side view of the accessory.
Figure 6:
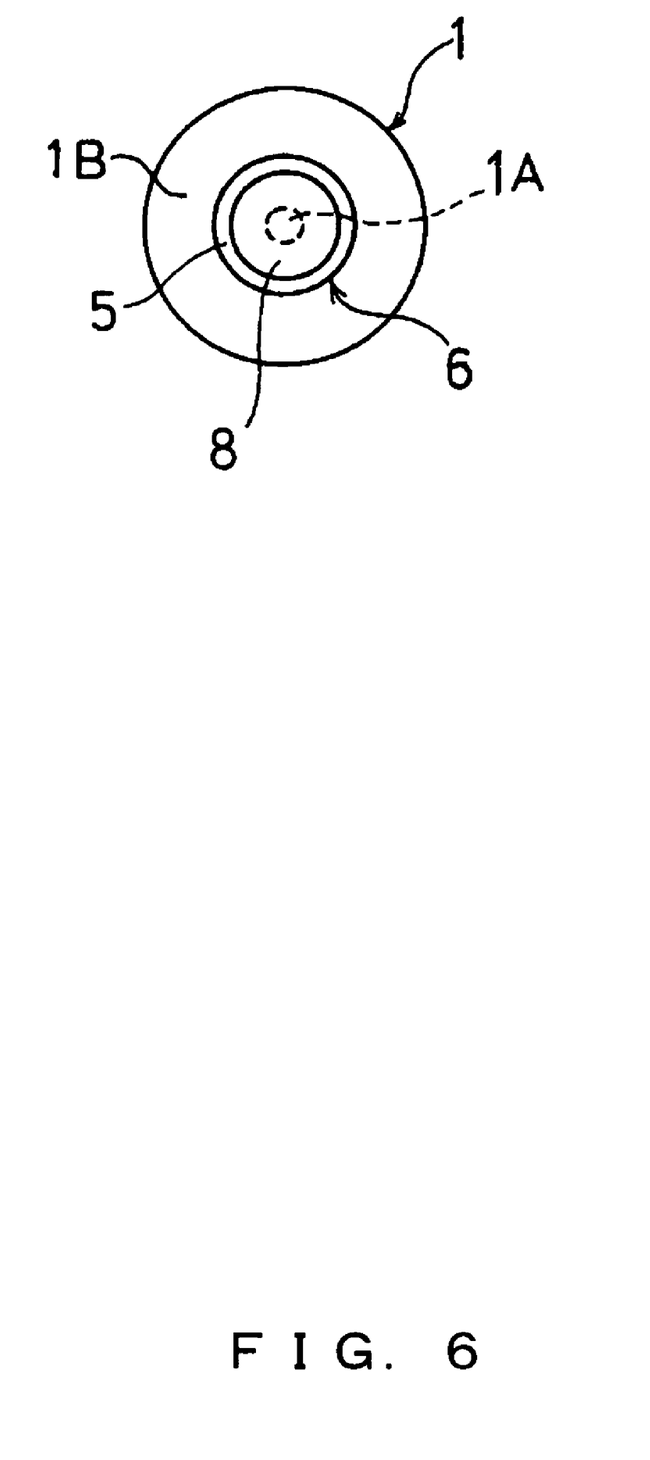
FIG. 6 is a conceptual enlarged rear view of the accessory.

FIG. 1 is a conceptual perspective view showing a state where an accessory according to the present invention is attached to eyeglasses (partially omitted and shown), FIG. 2 is a conceptual side cross-sectional view showing the state enlarged, FIG. 3 is a conceptual cross-sectional view taken along a line A—A in FIG. 2, FIG. 4 is a conceptual enlarged front view of the accessory, FIG. 5 is a conceptual enlarged side view of the accessory, and FIG. 6 is a conceptual enlarged rear view of the accessory. Top and bottom views of the accessory respectively become states where the side view is rotated by 90 degrees in counterclockwise and clockwise directions.

An accessory according to the present invention, which is denoted with a reference numeral 1, is used by being attached to a lens 3 of eyeglasses 2 (constituent elements on the side of the right eye are partially omitted and shown) as shown in FIG. 1, and has the following configuration. Namely, the accessory 1 comprises an insertion part 6, which is inserted into a through hole 3A that has a circular cross-section and is provided in the direction of thickness of the lens 3 in a portion where vision is not restricted, and configured by combining an insertion core part 1A made of, for example, metal and a sheathing member 5 made of an elastic material, and a basic accessory part made of, for example, metal, which is arranged jointly at an end 1D of the insertion core part 1A on the side of a surface 3B of the lens 3, as specifically shown in FIG. 2.

More specifically, any types such as vision corrective eyeglasses for shortsightedness, far sightedness, etc., sunglasses for preventing ultraviolet rays or strong light, stylish eyeglasses, etc. can be used as the eyeglasses 2 to which the accessory 1 is attached in the present invention.

The cross-section of the insertion part 6 is formed to be circular similar to the through hole 3A. The sheathing member 5 is made of an elastic material such as silicon rubber, and combined with the insertion core part 1A, for example, with an adhesive. The diameter of the sheathing member 5, accordingly, the diameter of the insertion part 6 is set to be slightly larger than that of the through hole 3A as indicated by a dashed line 7 in FIGS. 2 and 3 before the insertion part 6 is inserted into the through hole 3A. Accordingly, when the insertion part 6 is inserted into the through hole 3A, the sheathing member 5 is compressed by the through hole 3A due to the nature of the material of the sheathing member 5, and this state produces repulsive force. As a result, the insertion part 6 is pressed and fixed to the through hole 3A, accordingly, to the lens 3. Additionally, the length L (the horizontal length in FIG. 2) of each of the insertion part 6 and the insertion core part 1A is set to be identical to the thickness T (the horizontal length in FIG. 2) of the lens 3, and especially, the insertion core part 1A is configured not to protrude from the side of a back 3C of the lens 3 in order to prevent a face skin from being touched.

Additionally, for the insertion part 6, a pad part 8 which covers an end 1C is provided at the end 1C of the insertion core part 1A on the side of the back 3C of the lens 3. The pad part 8 is made of an elastic material such as silicon rubber similar to the sheathing member 5, and a surface 8A on a side opposite to a surface facing the insertion core part 1A, namely, the surface as opposed to the skin of a human body is formed, for example, to be spherical in order to softly touch the skin without injuring it. Here, the pad part 8 is fixed to both of the insertion core part 1A and the sheathing member 5, for example, with an adhesive in a state of straddling also the sheathing member 5.

In the meantime, the basic accessory part 1B is formed, for example, to be semispherical as an industrial design intended for decoration, and formed together with the insertion core part 1A as a single piece. Aesthetic processing, such as polishing, which is required to fulfill a decorative function, is performed for the basic accessory part 1B. In addition to such a configuration example, the basic accessory part 1B can be configured, for instance, with jewel, pearl, etc., which is linked to the end 1D of the insertion core part 1A on the side of the surface 3B of the lens 3 via a suitable base, as a matter of course.

The accessory 1 according to the present invention is attached to the eyeglasses 2 by inserting the insertion part 6 into the through hole 3A in the lens 3 of the eyeglasses 2. Since the accessory 1 has the above described configuration, it fulfills a function to decorate a wearing person by creating new beauty of the eyeglasses themselves with the basic accessory part 1B while maintaining the original function of eyeglasses. In the accessory 1, the insertion part 6 is fixed to the through hole 3A of the lens 3 via the sheathing member 5, whereby the insertion core part 1A does not make contact with the lens 3 due to vibrations in the use of the eyeglasses 2, and accordingly, a discomfort sound does not occur. Additionally, in the insertion part 6, the insertion core part 1A is sheathed with the sheathing member 5 made of an elastic material, whereby the lens 3 and the through hole 3A or its periphery are not damaged when the insertion part 6 is inserted into the through hole 3A of the lens 3. Furthermore, this accessory 1 can be attached with extreme ease without requiring another part as a stopper only by inserting the insertion part 6 into the through hole 3A of the lens 3, the insertion part 6 is pressed and fixed to the through hole 3A with the repulsive force of the sheathing member 5, and also frictional force with the compressed sheathing member 5 is simultaneously applied to the insertion core part 1A. Therefore, it is difficult to remove the accessory 1, which is once attached to the lens 3, by pulling out of the lens 3, and accordingly, it never drops from the lens 3, and there is no possibility of being lost for this reason. Besides, even if external force F is applied as indicated by a character F in FIG. 2 when the basic accessory part 1B is touched, for example, with a finger, the external force F is absorbed by the sheathing member 5 via the insertion core part 1A. Accordingly, there is a very low possibility that the basic accessory part 1B breaks at and drops from the end 1D of the insertion core part 1A on the side of the surface 3B of the lens 3.

Furthermore, since the length L of each of the insertion part 6 and the insertion core part 1A is identical to the thickness T of the lens 3, they do not protrude from the side of the back 3C of the lens 3. Accordingly, they do not touch and injure the skin of a face or the like, and are safe. Still further, because the end 1C of the insertion core part 1A on the side of the back 3C of the lens 3 is covered with the pad part 8, the pad part 8 prevents the skin from being injured without fail even if the insertion core part 1A protrudes from the side of the back 3C of the lens 3 due to some reason such as a slight size error, etc.

The present invention is not limited to the above described preferred embodiment. A variety of modifications can be made within a scope which does not deviate from the gist of the present invention. For example, the cross-section of the insertion part can be formed to be a shape other than a circle, such as a polygon, in accordance with the shape of the cross-section of the through hole provided in the lens. Additionally, the insertion core part is represented as an element formed as a thin pin in the preferred embodiment shown in the drawings. However, the insertion core part can be made as thick and close to the diameter of the through hole as possible. As the method for combining the insertion core part and the sheathing member, for example, a method for combining the silicon rubber with the insertion core part by using thermal adhesiveness, or for engaging the insertion core part with the sheathing member by providing, for example, concavity and convexity in the insertion core part can be available in addition to the above described adhesive. Furthermore, frictional force with the insertion core part, which occurs when the sheathing member is compressed, can be made high depending on a material of the sheathing member. Therefore, a state where the sheathing member and the insertion core part are combined with this frictional force can be obtained without using an adhesive. In this case, the action of the frictional force prevents a situation where the insertion core part is made apart from the sheathing member and pulled out towards the side of the basic accessory part due to some reason. Still further, the joint arrangement of the insertion core part and the basic accessory part can be configured by adopting a suitable method according to a material, shape, size, etc., such as a joint made by welding the insertion core part and the basic accessory part, combination made by mechanically engaging the insertion core part with the basic accessory part by forming concavity and convexity, etc. in addition to the above described arrangement as a single piece. Still further, the pad part can be provided not by bonding to the insertion core part, but by being formed at the end of the insertion core part as a single piece, as a matter of course. Accordingly, the insertion core part and the basic accessory part can be configured as a single member by forming them as a single piece.

What is claimed is:

1. An accessory, comprising:

an insertion part, which is inserted into a through hole provided in a direction of thickness of a lens of eyeglasses and configured by combining an insertion core part with a sheathing member made of an elastic material; and a basic accessory part arranged jointly at an end of the insertion core part on a side of a surface of the lens, wherein said insertion part is pressed and fixed to the through hole with repulsive force caused by compression of the sheathing member, and a pad part which covers an end is provided at the end of the insertion core part on a side of a back of the lens.

2. The accessory according to claim 1, wherein a length of said insertion part is set to be identical to the thickness of the lens.

3. The accessory according to claim 1, wherein the end of the insertion core part has the same diameter regardless of a position in a longitudinal direction, and the pad part has a larger diameter than the diameter of the insertion core part.

4. The accessory according to claim 1, wherein the pad part is made of an elastic material.

* * * * *

UNITED STATES PATENT AND TRADEMARK OFFICE
CERTIFICATE OF CORRECTION

PATENT NO. : 7,249,840 B1 Page 1 of 1
APPLICATION NO. : 11/510975
DATED : July 31, 2007
INVENTOR(S) : Dobashi et al.

It is certified that error appears in the above-identified patent and that said Letters Patent is hereby corrected as shown below:

<u>In the Claims</u>:

Col. 6, line 25, delete "the end of".

Signed and Sealed this

Tenth Day of June, 2008

JON W. DUDAS
*Director of the United States Patent and Trademark Office*